United States Patent [19]

Lange

[11] 3,943,537

[45] Mar. 9, 1976

[54] LOCKING MEANS FOR CAMERA

[75] Inventor: Karl Heinz Lange, Bunde, Germany

[73] Assignee: Balda-Werke, Bunde, Germany

[22] Filed: July 10, 1974

[21] Appl. No.: 487,079

[52] U.S. Cl. .............................. 354/288; 136/173
[51] Int. Cl.² ..................................... G03B 17/02
[58] Field of Search .......... 354/217, 218, 288, 289, 354/354; 312/20; 352/242; 292/DIG. 48, 87, 145; 136/173

[56] References Cited
UNITED STATES PATENTS

| | | | |
|---|---|---|---|
| 1,278,323 | 9/1918 | Folmer | 292/DIG. 48 |
| 2,927,357 | 3/1960 | Lange | 354/354 X |
| 2,946,269 | 7/1960 | Maiershofer | 354/288 |
| 3,259,410 | 7/1966 | Neudecker et al. | 354/288 X |
| 3,459,323 | 8/1969 | Boothman | 354/288 X |
| 3,742,832 | 7/1973 | Stoneham et al. | 354/354 X |
| 3,753,389 | 8/1973 | Monks | 354/354 |

FOREIGN PATENTS OR APPLICATIONS

| | | | |
|---|---|---|---|
| 1,239,190 | 4/1967 | Germany | 354/288 |

Primary Examiner—Fred L. Braun
Attorney, Agent, or Firm—Blum, Moscovitz, Friedman & Kaplan

[57] ABSTRACT

The rear cover for a film camera pivotably connected at one end to the camera housing and connectable at its other end to the housing is provided with a lock for releasably connecting the connectable end of the rear cover to the camera housing. The lock comprises a bias integrally connected to the film viewing window secured in the rear cover of the camera and a latch cooperating with the bias for releasably connecting the connectable end of the rear cover to the camera housing. In a second aspect of the invention, a second bias is provided which is integrally connected to the film viewing window and releasably secures a battery cell to the rear cover of the camera. In a third aspect of the invention, a structure for securing a battery cell to the rear cover of the camera is provided which is integrally connected to the film viewing window located therein.

16 Claims, 15 Drawing Figures

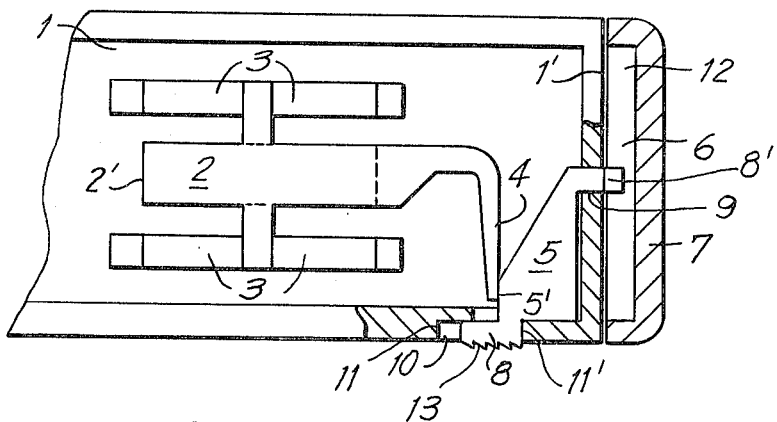
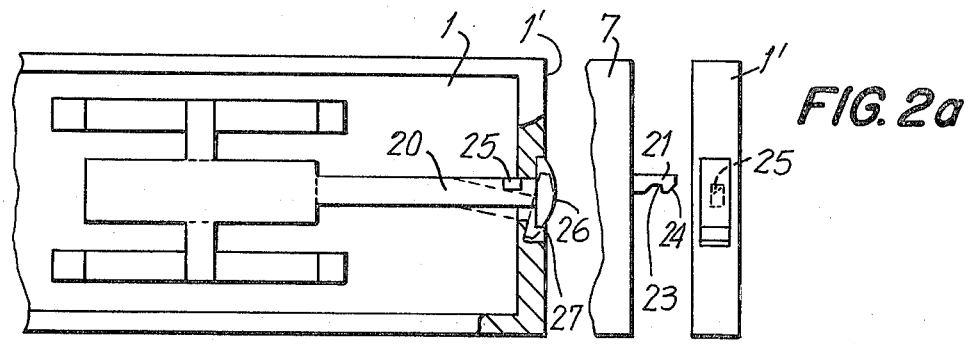
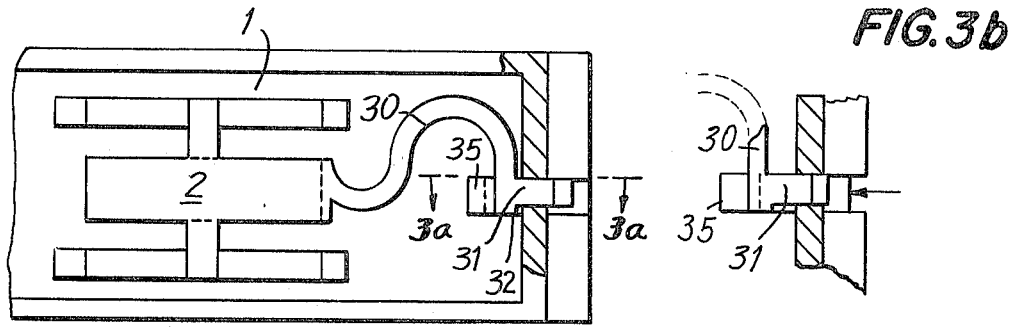
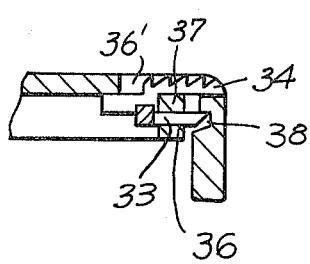
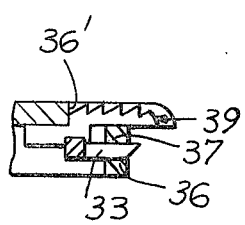

3,943,537

LOCKING MEANS FOR CAMERA

BACKGROUND OF THE INVENTION

This invention relates generally to improved locking means for a camera. More particularly, a first aspect of the invention relates to improved locking means for releasably securing the rear cover of a camera at its connectable end to the camera housing. Another particular aspect of the invention relates to concomitant means for releasably securing a battery cell to the rear cover of the camera.

It is known to provide roll-film cameras with a rear cover pivotably connected at one end to the camera housing and releasably connected to the camera housing at the other end. These rear covers are conveniently provided with a film viewing window for indicating the advancement of the film. Conventionally, expensive and discrete releasable locks have been employed for releasably connecting the connectable end of the rear cover to the camera housing. The releasable lock enables access into the housing to, for instance, change the film-load secured therein and for locking the rear cover against the camera housing to place the camera in operative condition.

It is now found that an improved locking means may be provided which is integrally connected to the film viewing window, less expensive than prior locks and of relatively simple construction as compared with the conventional discrete locks.

SUMMARY OF THE INVENTION

Generally speaking, in accordance with the invention, an apertured rear cover for a film camera of the type including a camera housing for an objective, a viewer and a film load, is provided with a substantially flat viewing window secured in the cover aperture thereof. The rear cover is fitted to the camera housing and one end thereof is pivotably connected to the housing, while the other end thereof is connectable to the camera housing. An improved locking means for releasably securing the connectable end of the rear cover to the camera housing is provided which comprises biasing means integrally connected to the viewing window in the rear cover and latch means cooperating with the biasing means for releasably connecting the connectable end of the rear cover to the camera housing.

In another aspect of the invention, where the camera includes means for operatively connecting a flash attachment thereto of the type energized by a cell secured on the rear cover, a second biasing means is provided which is integrally connected to the viewing window for biasing a battery cell into securement with the rear cover.

Another aspect of the invention relates to an improved film viewing window slidably connected in the rear cover aperture including a biasing means integrally connected to one end thereof and battery cell securing means integrally connected to the biasing means. The biasing means normally biases the securing means against a cell engaged thereby, and pressure responsive release means is provided which is connected to the viewing window for sliding the viewing window and securing means from engagement with the cell, so as to permit an engaged cell to be removed.

Accordingly, it is an object of this invention to provide improved locking means for releasably connecting the connectable end of a rear cover to the camera housing.

Another object of the invention is to provide an improved locking means which is integrally connected with the film viewing window located in the rear cover of the camera.

A further object of the invention is to provide battery securing means which are integrally connected to the film viewing window located in the rear cover of the camera.

Still another object of the invention is to provide improved locking means and battery securing means which are both integrally connected to the film viewing window located in the rear cover of a film camera.

Still other objects and advantages of the invention will, in part, be obvious and will, in part, be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a fragmented sectional view taken through the camera housing and showing one embodiment of the improved locking means constructed in accordance with the invention;

FIG. 1a is a perspective view of the film viewing window and biasing means integrally connected thereto as represented in FIG. 1;

FIG. 2 is a fragmented sectional view taken through the camera housing and showing another embodiment of an improved locking means constructed in accordance with the invention;

FIG. 2a is a detail view of the restraint for the latch as more generally shown in the improved locking means depicted in FIG. 2;

FIG. 3 is a fragmented sectional view taken through the camera housing which shows still another embodiment of the improved locking means constructed in accordance with the invention;

FIG. 3a is a detail view of the lug provided in connection with the locking means shown in FIG. 3, taken along line 3a—3a thereof;

FIG. 3b is a detail view showing the operation of the lug shown in FIG. 3a;

FIG. 3c is a detail sectional view further showing the operation of the lug more generally shown in FIG. 3a;

DESCRIPTION OF THE PREFERRED EMBODIMENTS

Figure 4:
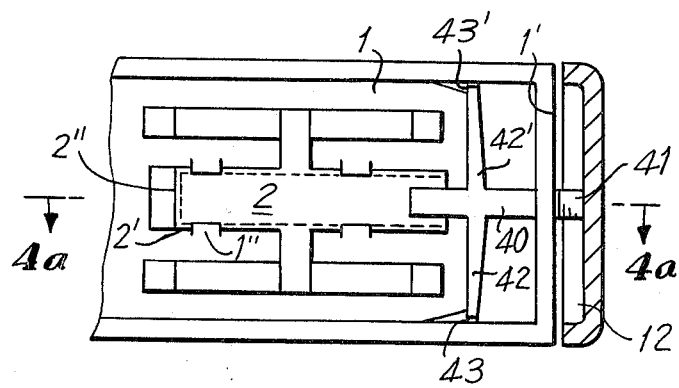
FIG. 4 is a fragmented sectional view taken through the camera housing showing yet another embodiment of the improved locking means constructed in accordance with the invention.

Generally referring to the Figures, an apertured rear cover for a film camera of the type including a camera housing for an objective, a viewer and a film-load is provided. The rear cover is provided with a film viewing window secured in the rear cover aperture and the viewing window is substantially flat in the plane of the rear cover. The rear cover is of the general type which is fitted to the camera housing and has an end pivotably connected to the housing and another end connectable to the camera housing.

With particular reference to FIGS. 1–4a and 8, the type of film viewing window which may be employed is of the type disclosed in U.S. Pat. No. 3,550,512, for Photographic Cameras, issued Dec. 29, 1970 to Karl Heinz Lange. The film viewing window 2 is snap-fitted into an aperature 2' provided in rear cover 1 of the camera. A pair of spring members 3 are integrally connected to film viewing window 2 for applying pressure to a film cartridge loaded within the camera housing 7. In all but FIG. 8, only a fragment of the camera housing is shown. The rear cover may be of the type pivotably connected at one end to the camera housing and connectable thereto as at an end 1'. In FIGS. 1–4a, only the connectable end of the rear cover is shown, while at FIG. 8 a full view of rear cover 1 is depicted. The particular construction of the rear cover and its connection to the camera housing is not critical to the invention, as the invention may have application to numerous film viewing windows and rear cover constructions which are releasably connected to a camera housing 7.

Referring now to FIGS. 1 and 1a, a torsion spring 4 is integrally connected at one of its ends to viewing window 2 and is bent so as to abut and apply a constant and continuous pressure against a substantially rigid abutment member 5 which is slidably connected to rear cover 1 and movable thereon between first and second positions which correspond to closed and open positions of said rear cover for thereby securing and releasing rear cover 1 to and from housing 7. Member 5 is simultaneously releasably connected to camera housing 7 and cooperable with torsion spring 4 for locking rear cover 1 against camera housing 7, as hereinafter described in detail. Abutment member 5 includes an abutment surface 5' and a pair of sliding bearings, respectively, 8 and 8'. Sliding bearing 8' is slidable through a channel 9 provided in rear cover 1 into an access space 6 provided in housing 7.

Bearing 8 is slidable in a recess 10 provided in rear cover 1 between first and second positions which correspond to first and second positions of abutment member 5.

Torsion spring 4 abuts surface 5' of member 5 and urges it into the first position therefor so as to locate bearing 8' in access space 6 when rear cover 1 is closed against housing 7. Concomitantly therewith, bearing 8 is slid to its first position in slot 10 which is delimited by a pair of steps 11 and 11' provided in rear cover 1.

Access space 6 is defined between camera housing 7 and a lip or rigid restraint 12 depending therefrom into the plane of rear cover 1. Lip 12 is generally contiguous with connectable end 1' of rear cover 1. Lip 12 abuts bearing 8' when rear cover 1 is closed against housing 7 for maintaining the rear cover closed. Bearing 8 is movable from its first to second positions by a sliding pressure exerted on serrated surface 13 thereof which overrides the force of spring 4 on abutment member 5 for thereby dislocating bearing 8' from access space 6, whereby connectable end 1' of rear cover 1 is disconnected from housing 7 and may be pivoted outwardly for opening cover 1.

Referring now generally to FIGS. 2–4a and 8, the film viewing window employed in connection with the embodiment shown therein is of substantially identical construction with the viewing window set forth in detail in connection with FIGS. 1 and 1a. The camera housing and rear cover therefor are also substantially of identical construction and therefore, the same general numerical designations are employed in connection therewith and for the film viewing window.

Referring now to FIGS. 2 and 2a, a flat leaf spring 20 is provided and has a free end (not shown) and another end integrally connected to viewing window 2. Leaf spring 20 lies substantially in the plane of viewing window 2 and the free end thereof extends into the interface between connectable end 1' of rear cover 1 and camera housing 7. In connection with this embodiment, rear cover 1 is of the type which overfits housing 7 rather than of the type fitted into a recess of housing 7 as particularly shown in FIG. 1.

A lug or rigid restraint 21 is mounted on an end wall 22 of camera housing 7 at a perpendicular to rear cover 1 when the rear cover is closed against camera housing 7. Lug 21 is provided with a faceted undersurface 23 and a tapered node 24 introducing into the faceted undersurface 23.

A cam surface 25 is provided on leaf spring 20 in substantial alignment with lug 21 for camming on lug 21 into securement on faceted undersurface 23 thereof as rear cover 1 is closed against camera housing 7. In the camming action, leaf spring 20 is downwardly displaced.

A release knob 26 is mounted on the free end of leaf spring 20 and extends beyond the releasable joint of connectable end 1' of rear cover 1 and camera housing 7. Leaf spring 20 is responsive to a downward pressure exerted on release knob 26 and a displacement channel 27 is provided in rear cover 1 for accommodating the displacement of leaf spring 20 and release knob 26 while the cam surface 25 is being moved into or out of connection with lug 21. Leaf spring 20 is downwardly displaceable in channel 27 for securing or releasing it to and from lug 21.

Referring now to FIGS. 3–3c, an S-shaped torsion spring 30 is provided and has an end integrally connected to film viewing window 2 and another end integrally connected to a lug 31. Lug 31 includes a depending stem 32 and a pair of bifurcations 33 and 34 substantially perpendicular to stem 32. A slot 35 is provided in rear cover 1 which extends through connectable end 1' thereof. Lug 31 is slidable in slot 35 which includes a pair of channels 36 and 36' which are each arranged to receive a respective bifurcation 33 and 34. Channel 36' extends to the exterior surface of rear cover 1 and bifurcation 34 is slidable therein and observable on the exterior surface of rear cover 1. Channel 36 is located in the interior of rear cover 1 relative to channel 36' and bifurcation 33 is slidable therein.

A strut 37 of rear cover 1 defines slot 35 into respective channels 36 and 36' and provides a partition against which stem 32 abuts for the purpose hereinafter described. A notch 38 is provided in the side wall of housing 7 and communicates with channel 36 whereby bifurcation 33 of lug 31 locates therein when rear cover 1 is closed against camera housing 7. Torsion spring 30 normally biases lug stem 32 against strut 37 of rear cover 1 for thereby locating bifurcation 33 through channel 36 into notch 38. Under the circumstances described, rear cover 1 is closed and connectable end 1' thereof is releasably secured to camera housing 7.

To disconnect end 1' of the rear cover from camera housing 7, a sliding pressure is exerted on bifurcation 34 in the direction shown by arrow 39 on the serrated exterior surface of the bifurcation. The force exerted must be in excess of the bias provided by spring 30 for thereby sliding lug 31 through slot 35 and thereby dislocating bifurcation 33 from notch 38 so as to disconnect end 1' of rear cover 1 from camera housing 7. In this condition, rear cover 1 may be outwardly opened.

Figure 4A:
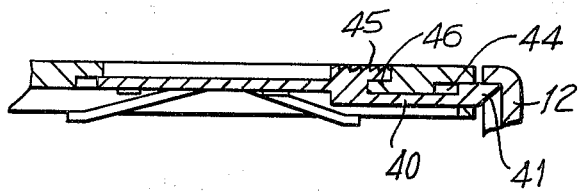
FIG. 4a is a sectional view of the embodiment shown in FIG. 4, taken along line 4a—4a thereof.

Referring now to FIGS. 4 and 4a, viewing window 2 is of substantially the same construction as shown in FIGS. 1–3c, however, it is provided with a beaded edge 2'' received in a recess therefor in the film viewing window aperture 2' in rear cover 1. Tongues 1'' secure viewing window 2 to rear cover 1 and film viewing window 2 is slidable in aperture 2'.

A rigid member 40 is integrally connected to film viewing window 2 at one end and is provided with a stepped shoulder 41 which is connected thereto at its other end. Stepped shoulder 41 extends beyond end 1' of rear cover 1 for a purpose hereinafter described. A pair of opposed substantially coaxial spring arms 42 and 42' are connected to rigid member 40 at a perpendicular. A pair of opposed abutment surfaces 43 and 43' located in rear cover 1 abut respective spring arms 42 and 42' for normally locating stepped shoulder 41 a predetermined distance beyond end 1' of rear cover 1. Concomitantly therewith, window 2 has a predetermined position in slot 2'.

Stepped shoulder 41 is slidable in a slot 44 of predetermined length provided in rear cover 1 so as to permit shoulder 41 to dislocate from its normal position beyond end 1' of rear cover 1. As hereinbefore described in connection with FIG. 1, a lip 12 depends from housing 7 and extends into the plane of rear cover 1 when rear cover 1 is closed against housing 7. Lip 12 is generally contiguous with end 1' of rear cover 1. An access space 6 is defined between camera housing 7 and lip 12 and slot 44 provided in rear cover 1 for stepped shoulder 41 communicates with access space 6 when cover 1 is closed against housing 7 so as to permit stepped shoulder 41 to at least partially locate in access space 6 in response to pressure exerted thereon by respective spring arms 42 and 42'. Lip 12 abuts stepped shoulder 41 when rear cover 1 is closed against housing 7.

A slidable release member 45 is respectively connected to viewing window 2 and rigid member 40. Release member 45 is slidable in a recess 46 provided in the exterior surface of rear cover 1 and cooperates with film viewing window 2 and rigid member 40 for disconnecting end 1' from housing 7. Stepped shoulder 41 is responsive to a sliding pressure exerted on release member 45 which exceeds the force of the bias provided by spring arms 42 and 42' so as to retract stepped shoulder 41 from lip 12 for thereby disconnecting end 1' of rear cover 1 from camera housing 7 so as to permit rear cover 1 to be opened.

Figure 8:
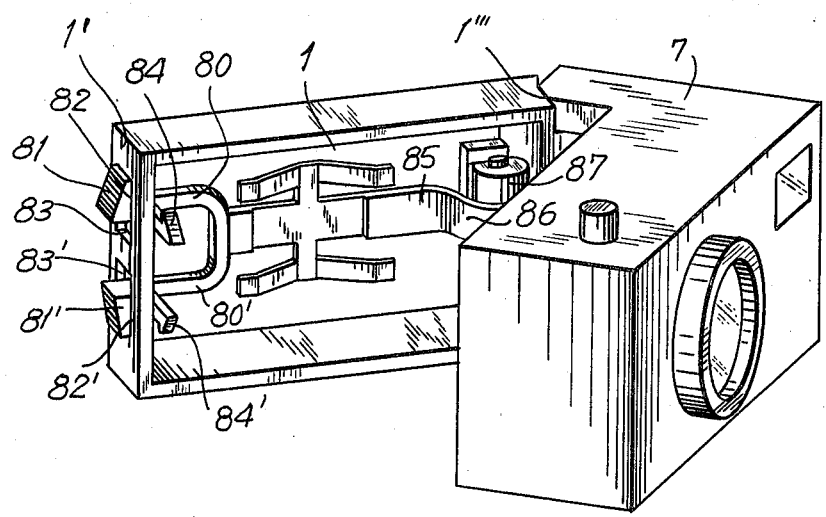
FIG. 8 is a perspective view of a camera housing and rear cover therefor including a film viewing window provided with an integrally connected improved locking means and concomitant battery securing means.

Referring now to FIG. 8, a pair of substantially parallel, co-planar spring arms 80 and 80' are integrally connected to viewing window 2. Respective spring arms 80 and 80' terminate in respective lugs 81 and 81', each lug being provided with a respective abutment surface 82 and 82' substantially perpendicular to its respective spring arm 80 and 8'. Lugs 81 and 81' are located on the exterior of rear cover 1 and are slidable thereon along their respective abutment surfaces 82 and 82'. A pair of slots 83 and 83' are provided in end 1' of rear cover 1 and have respective predetermined and substantially equal lengths so as to permit a predetermined displacement of lugs 81 and 81' on end 1' of rear cover 1.

A pair of pressure responsive hook members 84 and 84' are located within rear cover 1 in proximity to end 1' thereof. Each hook member is connected to a respective spring arm 80 and 80' at a perpendicular and hook members 84 and 84' are substantially parallel. A pair of recesses (not shown) are located in camera housing 7 and are arranged to receive respective hooked ends of hook members 84 and 84' when rear cover 1 is closed against camera housing 7.

Hooked ends of respective hook members 84 and 84' are dislocatable from their respective recesses in housing 7 by substantially equal and opposite sliding pressures exerted respectively and simultaneously upon lugs 81 and 81' whereby end 1' may be disconnected from housing 7. By the application of pressure to lugs 81 and 81', simultaneously, each lug is displaced on end 1' when the pressure exerted thereon exceeds the force of spring arms 80 and 80'. Upon application of such excess pressure, hook members 84 and 84' disconnect from their respective recesses in housing 7 and cover 1 may be opened.

To the opposite end of viewing window 2, a leaf spring 85 is integrally connected. Leaf spring 85 extends towards pivotably connected end 1''' of rear cover 1 and is provided with a raised portion 86 for locating a battery cell 87 thereunder. Spring 85 exerts sufficient pressure against cell 87 to secure it to rear cover 1. To remove battery 87 therefrom, raised portion 86 of spring 85 may be deformed temporarily.

In the manner shown and described in connection with FIG. 8, camera locking means and battery securing means may both be integrally connected to the film viewing window in the camera. In a similar manner, the embodiments shown in FIGS. 1–4a may be modified to include the same or similar battery securing means, for instance, of the type particularly shown in FIGS. 6 and 7.

Figure 6:
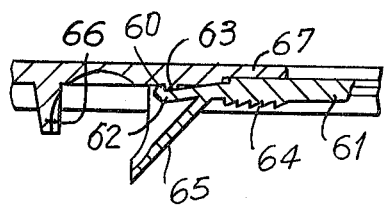
FIG. 6 is a detail view of a battery cell securing means which may be employed in connection with the invention.
Figure 7:
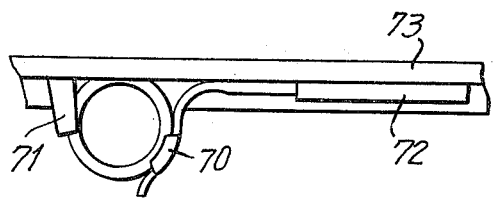
FIG. 7 is a detail view of another embodiment of a battery cell securing means which may be employed in connection with the invention.

Two additional examples of battery securing means which may be employed in connection with the invention are best seen in FIGS. 6 and 7. In FIG. 7, a leaf spring 70 is integrally connected to film viewing window 72 and extends toward the pivotably connected end of rear cover 73. Leaf spring 70 is provided with a raised portion for locating a battery thereunder and biasing the battery against rear cover 73 and abutment member 71 provided therein.

Referring now to FIG. 6 which depicts another securing means embodiment, and shows a modification which may be made to the film viewing window. In this embodiment, the film viewing window and battery securing means are releasably connected to rear cover 67. A resilient tongue 60 is integrally connected to a viewing window 61 and extends in the plane thereof, for instance, towards the pivotably connected end of rear cover 67. Tongue 60 is provided with a hooked end 62 which releasably connects behind a fixed shoulder 63 provided in rear cover 67. A release means 64 comprising a serrated surface is provided in tongue 60 and sliding pressure may be exerted thereon to resiliently deform hooked end 62 to dislocate it from securement with fixed shoulder 63. Flange 65 is integrally connected to tongue 60 and angularly disposed relative thereto. When tongue 60 is connected to rear cover 67, flange 65 secures a cell (not shown) against rear cover 67 and abutment 66. The cell may be released by dislocating tongue 60 from fixed shoulder 63.

Figure 5:
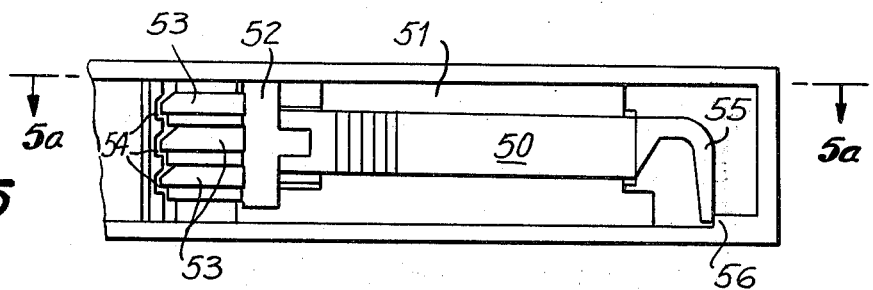
FIG. 5 is a fragmented sectional view taken through the camera housing showing an embodiment of an improved battery cell securing means integrally connected to the film viewing window located in the rear cover of the camera casing.
Figure 5A:
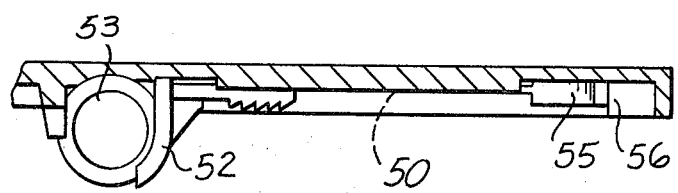
FIG. 5a is a sectional view of the embodiment shown in FIG. 5, taken along line 5a—5a thereof.

Referring now to FIGS. 5 and 5a, an improved viewing window 50 is provided which is slidably connected in the rear cover 51 of a film camera. Retaining means 52 for one or more electrical cells is connected to viewing window 50. A plurality of cells 53 is removably mounted in a corresponding plurality of recesses 54 provided in cover 51. Recesses 54 are preferably configured to prevent improper insertion of the cells therein. Viewing window 50 is arranged for sliding, for instance, by well-known means, and is urged by an integrally connected spring 55 towards the left for clamping and retaining cells 53 in position. The leftward bias is provided by the angular disposition of spring 55 against abutment 56.

Spring loaded conductors (not shown) may be provided in the camera housing which contact cells 53 when rear cover 51 is closed. The contacts will, therefore, be moved and "cleaned" every time the camera is loaded with film.

Locking means and cell securing means constructed in accordance with the invention perform reliably and are easy to fabricate. Moreover, if either means wears through use, the part may be replaced by mere replacement of the film viewing window to which it is connected. When these parts are integrally molded with the rear cover or camera housing, then replacement requires a new rear cover or housing, as may be the case.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In an apertured rear cover for a film camera of the type including a camera housing for an objective, a viewer and a film load, said rear cover defining a plane and having a film viewing window secured in said cover aperture said rear cover being fitted to said camera housing and having an end pivotably connected to said housing and another end connectable to said camera housing, an improved locking means for releasably securing said rear cover at its connectable end to said camera housing comprising biasing means integrally connected to said viewing window in said rear cover and latch means cooperating with said biasing means for releasably connecting said connectable end of said rear cover to said camera housing.

2. The improved locking means as claimed in claim 1, said latch means including a pressure responsive latch connected to said biasing means, and said housing including a rigid restraint for said latch connected to said camera housing, said biasing means normally biasing said latch against said restraint when said rear cover is closed against said camera housing, and said rear cover having a channel therein for slidably connecting said latch against said restraint.

3. The improved locking means as claimed in claim 2, said latch means further including pressure responsive release means movable from a closed to an open position, said release means being operatively connected to said latch for slidably disconnecting said latch, through said channel, from said restraint by application thereto of a pressure which overrides said bias for thereby releasing said connectable end of said rear cover from said camera housing for pivoting said rear cover about its pivotably connected end for thereby opening said rear cover for access into the interior of said camera housing.

4. The improved locking means as claimed in claim 2, said restraint for said latch including a lip depending from said camera housing, said lip extending into the plane of said rear cover in a closed condition thereof and being contiguous with said connectable end thereof, and an access space between said lip and said housing, said channel provided in said rear cover communicating with said access space in said closed condition of said rear cover, so as to permit said latch to at least partially locate in said access space in response to pressure exerted thereon by said biasing means, said lip abutting said latch in a closed condition of said rear cover.

5. The improved locking means as claimed in claim 2, said rigid restraint comprising a lug mounted on said camera housing at a perpendicular to said rear cover in said closed condition thereof, said lug having a faceted undersurface and a tapered node introducing into said faceted undersurface, said latch comprising a cam surface provided on said biasing means, said biasing means camming thereon into securement on said faceted undersurface of said lug as said rear cover closes against said camera housing.

6. The improved locking means as claimed in claim 1, said biasing means comprising a torsion spring integrally connected at one of its ends to said viewing window, and said latch means comprising a pressure responsive, substantially rigid abutment member slidably connected to said rear cover between first and second positions thereon, releasably connected to said camera housing and cooperable with said torsion spring for locking said rear cover against said camera housing, said abutment member including an abutment surface and a pair of sliding bearings, one of said bearings being slidable through a channel provided in said rear cover into an access space provided in said housing, the other of said bearings being slidable in a recess provided in said rear cover between first and second positions which define said first and second positions of said abutment member, said torsion spring abutting said abutment surface of said member for urging said abutment member into said first position thereof so as to permit said one bearing to locate in said access space when said rear cover is closed against said housing, said other bearing being slid to its concomitant first position, said access space being defined between said camera housing and a lip depending therefrom into the plane of said rear cover and being contiguous with said connectable end thereof, said lip abutting said one bearing when said rear cover is closed for maintaining said rear cover closed, said other bearing being movable from its first to second positions by a pressure which overrides the force of said torsion spring on said abutment member for thereby dislocating said one bearing from said access space, whereby said rear cover may be opened.

7. The improved locking means as claimed in claim 1, said biasing means comprising a substantially flat leaf spring having a free end and another end integrally connected to said viewing window, said biasing means laying substantially in the plane of said viewing window and said free end thereof extending into an interface formed between said connectable end of said rear cover and said camera housing, and said latch means comprising a lug mounted on said camera housing at a perpendicular to said rear cover in a closed condition thereof, said lug having a faceted undersurface and a tapered node introducing into said faceted undersurface, a cam surface provided on said biasing means alignable with said lug for camming thereon into securement on said faceted undersurface of said lug as said rear cover closes against said camera housing, a release knob mounted on said free end of said flat leaf spring extending beyond the releasable joint of said connectable end of said rear cover and camera housing, said biasing means being responsive to a downward pressure exerted on said release knob, and a displacement channel provided in said rear cover, said biasing means being downwardly displaceable in said channel for securing or releasing it to and from said lug.

8. The improved locking means as claimed in claim 1, said biasing means comprising an S-shaped torsion spring having opposed ends, one of said ends being integrally connected to said viewing window, and said latch means comprising a pressure responsive lug integrally connected to said other end of said spring and slidably connected to said rear cover, said lug including a depending stem and a pair of bifurcations substantially perpendicular thereto, a slot provided in said rear cover which extends through said connectable end thereof, said lug being slidable in said slot, said slot including a pair of channels, each channel being arranged to receive a bifurcation of said lug, one of said channels communicating with the exterior surface of said rear cover, one of said bifurcations being slidable in said one channel and observable on the exterior surface of said rear cover, the other of said channels being located in the interior of said rear cover relative to said one channel and the other of said bifurcations being slidable therein, a strut of said rear cover defined between said channels partitions said slot into said respective channels, and a notch provided in said housing which communicates with said other channel for locating said other bifurcation of said lug therein when said rear cover is closed against said camera housing, said spring normally biasing said lug stem against said strut in said rear cover for locating said other bifurcation through said other channel into said notch provided in said housing, said lug being responsive to a pressure exerted on said one bifurcation which overrides the force of said bias for sliding said lug through said slot for thereby dislocating said other bifurcation from said notch so as to disconnect said connectable end of said rear cover from said camera housing for thereby opening said rear cover.

9. The improved locking means as claimed in claim 1, said viewing window being slidably connected to said rear cover, said biasing means comprising a rigid member having an end integrally connected to said viewing window and another end having a stepped shoulder connected thereto which extends beyond said connectable end of said rear cover, a pair of opposed substantially coaxial spring arms connected substantially at a perpendicular to said rigid member, a pair of opposed abutment surfaces located in said rear cover which abut said spring arms, respectively, of said biasing means for normally locating said stepped shoulder a predetermined distance beyond said connectable end of said rear cover, said stepped shoulder being slidable in a slot of predetermined length provided in said rear cover wherein said stepped shoulder may be dislocated from its normal position beyond said connectable end of said rear cover, and said latching means including a lip depending from said camera housing, said lip extending into the plane of said rear cover in a closed condition thereof and being contiguous with said connectable end thereof, an access space between said lip and said housing, said slot provided in said rear cover for said stepped shoulder communicating with said access space in said closed condition of said rear cover so as to permit said stepped shoulder to at least partially locate in said access space in response to pressure exerted thereon by said spring arms, said lip abutting said stepped shoulder in a closed condition of said rear cover, and a slidable release member connected respectively to said viewing window and said rigid member which is slidable in a recess provided in the exterior surface of said rear cover, said stepped shoulder being responsive to a sliding pressure exerted on said release member which exceeds the force of said bias so as to retract said stepped shoulder from said lip for thereby disconnecting said connectable end of said rear cover from said camera housing so as to permit said rear cover to be opened.

10. The improved locking means as claimed in claim 1, said biasing means comprising a pair of substantially parallel, co-planar spring arms integrally connected to said viewing window, each spring arm terminating in a lug provided with an abutment surface substantially perpendicular to its said respective spring arm, said lugs being located exteriorly of said rear cover and being slidable along their abutment surfaces thereon, and said latching means comprising a pair of pressure responsive hook members located within said rear cover in proximity to said connectable end thereof, each hook member being connected to a respective spring arm at a perpendicular and said hook members being substantially parallel, a pair of slots provided in said rear cover of predetermined length so as to permit a predetermined displacement of said lugs on said rear cover in response to a pressure thereon which exceeds the force of said biasing spring arms, a pair of recesses located in said camera housing arranged to receive respective hooked ends of said hook members when said rear cover is closed against said camera housing, said hooked ends of said respective hook members being dislocatable from said respective recesses therefor by equal and opposite sliding pressures exerted respectively and simultaneously upon said lugs so as to disconnect said connectable end of said rear cover from said camera housing for thereby opening said rear cover.

11. The improved locking means as claimed in claim 10, including a leaf spring integrally connected to said viewing window and extending towards said pivotably connected end of said rear cover, said leaf spring having a raised portion for locating a battery thereunder and biasing said battery into securement with said rear cover.

12. The improved locking means as claimed in claim 1, including second biasing means integrally connected to said viewing window and extending towards said pivotably connected end of said rear cover, said biasing means being arranged to overlay an electric cell for energizing a flash attachment and releasably secure said electric cell to said rear cover.

13. In an apertured rear cover for a film camera of the type including a camera housing for an objective, a viewer and a film load and means for operatively connecting a flash attachment thereto of the type energized by a cell secured on said rear cover, an improved film viewing window slidably connected in said rear cover aperture including a biasing means integrally connected to one end thereof and cell securing means integrally connected to said biasing means, said biasing means normally biasing said securing means against a cell engaged thereby, and pressure responsive release means connected to said viewing window for sliding said viewing window and securing means from engagement with a cell, so as to permit an engaged cell to be removed.

14. In an apertured rear cover for a film camera of the type including a camera housing for an objective, a viewer and a film load and means for operatively connecting a flash attachment thereto of the type energized by a cell secured on said rear cover, an improved film viewing window releasably connected to said rear cover, said releasable connection comprising a resilient tongue integrally connected to said viewing window and extending in the plane thereof, said tongue having a hooked end locatable behind a fixed shoulder provided in said rear cover.

15. The improvement as claimed in claim 14 including release means mounted on said tongue actuable by pressure exerted thereon for deforming said hooked end and dislocating it from securement with said fixed shoulder.

16. The improvement as claimed in claim 15 including means for releasably securing a cell on said rear cover, said last-mentioned means being integrally connected to said tongue and securing said cell to said rear cover when said hooked end of said tongue is located behind said fixed shoulder, said cell being released by said securing means when said tongue is dislocated from said fixed shoulder.

* * * * *